United States Patent
Pereira et al.

(10) Patent No.: US 6,724,341 B1
(45) Date of Patent: Apr. 20, 2004

(54) AUTONOMOUS ONBOARD ABSOLUTE POSITION AND ORIENTATION REFERENCING SYSTEM

(75) Inventors: Carlos M. Pereira, Tannersville, PA (US); Jahangir S. Rastegar, Stony Brook, NY (US); Edip Niver, Westfield, NJ (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/065,023

(22) Filed: Sep. 11, 2002

Related U.S. Application Data

(60) Provisional application No. 60/345,845, filed on Jan. 7, 2002.

(51) Int. Cl.[7] ................................................. F41G 7/00
(52) U.S. Cl. .................... 342/62; 244/3.1; 244/3.11; 244/3.14; 244/3.15; 244/3.19
(58) Field of Search ................................. 244/3.1, 3.11, 244/3.12–3.15, 3.19, 3.16; 342/61, 62, 147, 148–158, 175, 195, 352–367; 343/705–718, 772–786

(56) References Cited

U.S. PATENT DOCUMENTS

| | | | | |
|---|---|---|---|---|
| 3,000,598 A | * | 9/1961 | Bush | 244/3.13 |
| 3,137,853 A | * | 6/1964 | Cutler | 342/355 |
| 4,072,281 A | * | 2/1978 | Miller et al. | 244/3.16 |
| 5,099,246 A | * | 3/1992 | Skagerlund | 342/361 |
| 5,258,764 A | * | 11/1993 | Malinowski | 342/359 |
| 6,407,702 B1 | * | 6/2002 | Bergman et al. | 342/364 |

* cited by examiner

*Primary Examiner*—Bernarr E. Gregory
(74) *Attorney, Agent, or Firm*—Michael C. Sachs; John F. Moran

(57) ABSTRACT

An autonomous onboard absolute position and orientation referencing system provides a means of efficaciously and economically embedding guidance and control components into the fins of supersonic, highly maneuverable small, medium-caliber and long range munitions. Embedded resonant cavities form an integral part of the referencing system. The magnitude and phase information received by the integral antennas is used to determine the munition orientation. Embedded sensors provide continuous, onboard information about the angular orientation of the munition, such as its pitch, yaw, and roll angles, as well as its absolute position relative to a ground station.

42 Claims, 4 Drawing Sheets

AUTONOMOUS ONBOARD ABSOLUTE POSITION AND ORIENTATION REFERENCING SYSTEM

FEDERAL RESEARCH STATEMENT

[The invention described herein may be manufactured and used by or for the Government of the United States for governmental purposes without the payment of any royalties thereon.]

BACKGROUND OF INVENTION

1. Field of the Invention

The present invention relates to munitions, and it particularly relates to an orientation referencing system designed to measure a munitions angular orientation and position (distance from a ground point) with absolute onboard referencing. This orientation referencing system offers advantages to the guidance and control of smart munitions. Other advantages of the orientation referencing system implementation include: (1) the capability of a smart munition with such a sensing system to be capable of determining its position and orientation while in flight with respect to a point on the ground, (2) the capability of a munition to have autonomous orientation as a single munition (no requirements to triangulate with other munitions) to provide the capability of one hit, one kill, and (3) the sensing system will be minimally intrusive and consume relatively very low power.

2. Background of the Invention

Future combat systems will require a significant reduction in weight and a significant increase in performance for both platforms and munitions. Significant gains have been achieved in the areas of Micro-Electro-Mechanical (MEMs) technologies which, in turn, have made possible a significant reduction in the size and weight of accelerometer mechanisms and substantial performance enhancement of these devices under extreme operating conditions.

To take advantage of these advances and to meet the requirements of the U.S. Army's future needs in the areas of precision-guided direct-and indirect-fire munitions, it is important to develop sensors with unique characteristics that can be integrated reliably and economically into small-and medium-caliber munitions as well as long-range munitions. In particular, it is desirable to embed electromagnetic sensors in the munitions to enhance the guidance and control of munitions in flight and improve their accuracy. These sensors will provide real-time information on the orientation, rotation and position of munitions as well as define the orientation vectors of the center of mass. Such real-time information, used alone or in conjunction with gyroscopes and inertial measurement units (IMUs) will enable the deployment of a new generation of affordable munitions characterized by highly-steerable guidance and navigation control systems that will guide them to their targets with unprecedented accuracy, delivering heretofore unimaginable lethality with a minimal expenditure of ammunition.

Radar-based guidance of munitions is currently based upon the use of radio frequency (RF) antennas printed or placed on the surface of munitions to reflect RF energy emanating from a ground-based radar system. The reflected energy is then used to track the munition or the stream of bullets on the way to the target. In this scenario, the targeting radar illuminates both the munition and the target. Energy reflected from the munition and target provides tracking information. The radar measures the time difference between the return signals from the munitions in flight and from the target to determine munition angle information and to determine of the munition"s rotation and up-down reference.

RF antennas receive and radiate energy as a function of their size and geometric shape. Typically, a tracking radar is in the Ku band with a nominal frequency range of 12.4 GHz to 18 GHz and a freespace wavelength of 1.67cm–2.4 cm. This largely defines the size of the antennas that can be used. A narrow beam width of the reflected signal is important in achieving the required measurement of the difference between the pulse received from the illuminating radar and the target return and an accurate measurement of the roll angle for the munition.

Maximizing the magnitude of the return from the munition is important to distinguish the munition from "clutter." However, it is quite challenging to shape the antenna radiation pattern and its beam width for a munition. In particular, methods that rely of measuring the reflected radar energy currently require that the sensors (RF antennas) be placed on the surface of the munition. The added requirement that the antennas be gun-hardened and survivable during the extreme launch environment characteristic of small and medium caliber munitions greatly limits the effectiveness of the current generation of antennas.

Corrections to a munition"s flight path are currently possible but only if the munitions are equipped with an additional suite of internal sensors such as Inertia Measurement Unit (IMU"s), accelerometers, and gyroscopes. These sensors are relatively complex and inaccurate for the intended purpose herein. In addition, these sensors require inputs from a Global Positioning System (GPS) to define the munition"s orientation vectors.

The inherent problems associated with these components are manifold. The position of the munition is determined by a double integration of the acceleration signals sensed by onboard accelerometers. Integration errors and accelerometer drift interject various inaccuracies that become intolerable when these sensed and processed signals are used to determine the error signal for the control system of the munition.

Error signals should not depend on the signals being sensed or processed outside the munition while in flight. The dependency on onboard accelerometers, IMUs, gyroscopes, or other inertial sensing mechanisms that require other external calibration and correction signals, make the feedback loop so large that the resulting onboard error signal does not accurately represent the midcourse correction needed to strike the intended target. Moreover, reliance on GPS as part of the control system is problematic as GPS can be electronically jammed.

Hence, the current suite of electromagnetic sensors and even electromagnetic sensors augmented by accelerometers, IMUs, gyroscopes, and GPS, are incapable of meeting the increasingly stricter requirements for precision delivery of munitions. A new generation of sensors is thus required to meet this need.

These new sensors should be capable of providing onboard information about the angular orientation of the munition, i.e., its pitch, yaw, and roll angles, as well as its absolute position relative to a ground command station or the target (moving or stationary).

It is also desirable to have the capability to configure the sensory systems to provide onboard information about the position and orientation of the munition relative to an incoming target so that they can be used as a homing sensor. To achieve this goal, the sensors should require minimal or no computational and signal processing capability at the ground (command) station. By minimizing the role of the ground or command station in the guidance and control loop, the related sources of error and system and operational complexity that are otherwise introduced into the overall system can generally be minimized or eliminated.

In particular, the feedback loop needs to be kept as small as possible, thus requiring an autonomous onboard referencing orientation and position sensor system. In addition, the development of affordable guidance and control technologies is dependent on the development of accurate and reliable position and orientation sensors that are inexpensive to produce as well as easy to integrate into various munitions.

Currently, there is no means of meeting these requirements. Thus, there is a great and still unfulfilled need for a system of efficaciously and economically embedding guidance and control components in gun-fired munitions.

SUMMARY OF INVENTION

The development of an autonomous onboard absolute position and orientation referencing system (also referred to herein as "the referencing system") of the present invention fills this void by providing a means of efficaciously and economically embedding guidance and control components into the fins of supersonic, highly maneuverable small, medium-caliber and long range munitions. Embedded resonant cavities, which are an integral part of the on-board guidance and control system, receive, rather than simply reflect, electromagnetic energy from a ground-based radar source.

The magnitude and phase information received by the integral antennas is then used to determine the munition orientation, using a minimum of onboard electronics. Embedded sensors will provide continuous, onboard information about the angular orientation of the munition, i.e., its pitch, yaw, and roll angles, as well as its absolute position relative to a ground station.

Further, vector information will be sufficient for determining munition center-of-mass vectors and velocity rates during flight from close range to extended ranges. The disclosed sensors may be used alone or in conjunction with accelerometers, e.g., MEMS, accelerometers, rate gyroscopes, or IMUs, to correct for drift and other accumulated errors during flight in order to achieve downrange delivery accuracy against stationary and moving targets.

Advantageously, the same sensors that are used to receive radio frequency information can also transmit information, thus establishing full duplex communication with the ground station, enabling guidance and control information to be exchanged and accuracy to be enhanced. In particular, the waveguide cavities are in resonance when the polarized electric field is aligned with the preferred shorter dimension of the embedded aperture.

As the waveguide cavity rotates by 90 degrees, the waveguide is no longer in resonance. However, radar energy emitted from the illuminator is reflected back to the ground station in both cases. The characteristics of the reflected energy in both cases (in and out of resonance) contain information about the position and angular orientation of the munition. In fact, when the cavity is totally out of resonance, the reflected radar signal on the ground will contain information that defines the munition"s distance and orientation.

This information can be used to validate the orientation and position information sensed by the munition when the cavity is in resonance. Ultimately, this means that the embedded waveguide structures facilitates the implementation of an onboard sensor system with an onboard reference that allows the ground station to validate the performance of the munition and its onboard guidance and control sensors such as IMUs, gyroscopes, accelerometers, or like sensors.

In addition to its use as a means of validation, radar energy can be used to modulate information. Additional radio frequency links can be embedded to communicate between the ground and the munition.

A preferred implementation of the present invention relies on embedding in the fins of munitions a multiplicity of resonant apertures with rectangular cross-section. The resonant apertures are, in turn, equipped with an internal RF antenna placed at a strategic point within the cavity.

The resonant apertures equipped with internal RF antennas, which may be referred to generally as slot waveguide antennas, provide onboard orientation information based on the magnitude and phase of incoming electromagnetic energy provided by tracking radar. The resonant apertures may take the form of mechanically tuned waveguides, such as sectoral horn waveguides, that are machined into the fins or planar devices that rely on engineered electric permittivity profiles. By extension, resonant waveguide cavities can also be embedded in the body of the projectile to provide various functionality such as onboard information about the position and orientation of the munition relative to an incoming target so that they can be used as a homing sensor.

The invention of the present invention present numerous features, and in particular, the referencing system can be advantageously and economically integrated into the munition to receive radio frequency signals onboard the munition while it is in flight. Signals emanating from the ground station, which allow the munition to achieve heretofore unattainable levels of accuracy, need only be transmitted for very short periods of time and with a low duty cycle while providing the necessary information for a resonant cavity to operate. These resonant cavities may be thought of as special onboard RF antennas.

The principle of operation of the referencing system relies on the resonant receiving characteristics of mechanically tuned waveguide cavities designed into the structure to receive radio frequency signals. In an exemplary embodiment, the cavities are machined onto the fins or the body of a munition. The design of such waveguides can further take advantage of planar devices built from materials with specific dielectric profiles that represent alternatives for engineered devices out of homogeneous substrate dielectric materials.

The waveguide operates as a resonance type antenna when the propagated electric field aligns with the shorter side of the cavity. The waveguide is sensitive to polarization in a specific direction, which polarization is emitted from the illuminator on the ground. The illuminator sends a signal which is absorbed by the waveguide when it is in a first position (absorptive mode). When the waveguide is rotate 90 degrees, it reflects the signal (cross-polarized mode).

While any number of RF antenna types are available to implement the referencing system, a preferred antenna is a sectoral (or another type) waveguide antenna, because its geometry is inherently compatible with the fin geometry for a munition. Furthermore, the waveguide is inherently capable of withstanding the large accelerations associated with medium and small munitions. The waveguide cavities can be embedded in other parts of the projectile.

The asymmetry of the waveguide design is utilized to provide information related to the relative orientation of the waveguide with respect to the polarized illumination beam. Specifically, the resonant cavity design allows the referencing system to take advantage of low attenuation of the illumination beam in one axis and high attenuation in the other. In particular, these sensors are sensitive to the input polarization in the H-plane and will attenuate the incoming energy in the plane orthogonal to the H-plane (i.e., the E-plane).

In particular, the referencing system takes advantage of the directional sensitivity of rectangular apertures to polarized microwave illumination emanation from a ground-based source (tracking radar) which is transmitting a linearly polarized beam with a known orientation. The polarization thus establishes a known plane of reference as set by a ground source.

The received microwave energy provides magnitude and phase information from which directional/orientation data may be derived. Additionally, when the embedded waveguides are placed a known distance apart along the length of the projectile they can determine the time delay for the signal from the ground illuminator to reach the munition at each waveguide. The precise time delay relates to the velocity and distance of the munition from the illuminator.

Thus, munition with embedded waveguides can measure orientation and distance of the munition from the ground illuminator. This information available onboard the munition in flight will provides an autonomous onboard absolute position and orientation referencing system and results in an absolute onboard position and orientation referencing system for munitions in flight. In all cases, the munition recognizes its position and orientation relative to the launch platform.

BRIEF DESCRIPTION OF DRAWINGS

The above and other features of the present invention and the manner of attaining them, will become apparent, and the invention itself will be best understood, by reference to the following description and the accompanying drawings, wherein.

Similar numerals refer to similar elements in the drawings. It should be understood that the sizes of the different components in the figures are not necessarily in exact proportion or to scale, and are shown for visual clarity and for the purpose of explanation.

DETAILED DESCRIPTION

Figure 1A:
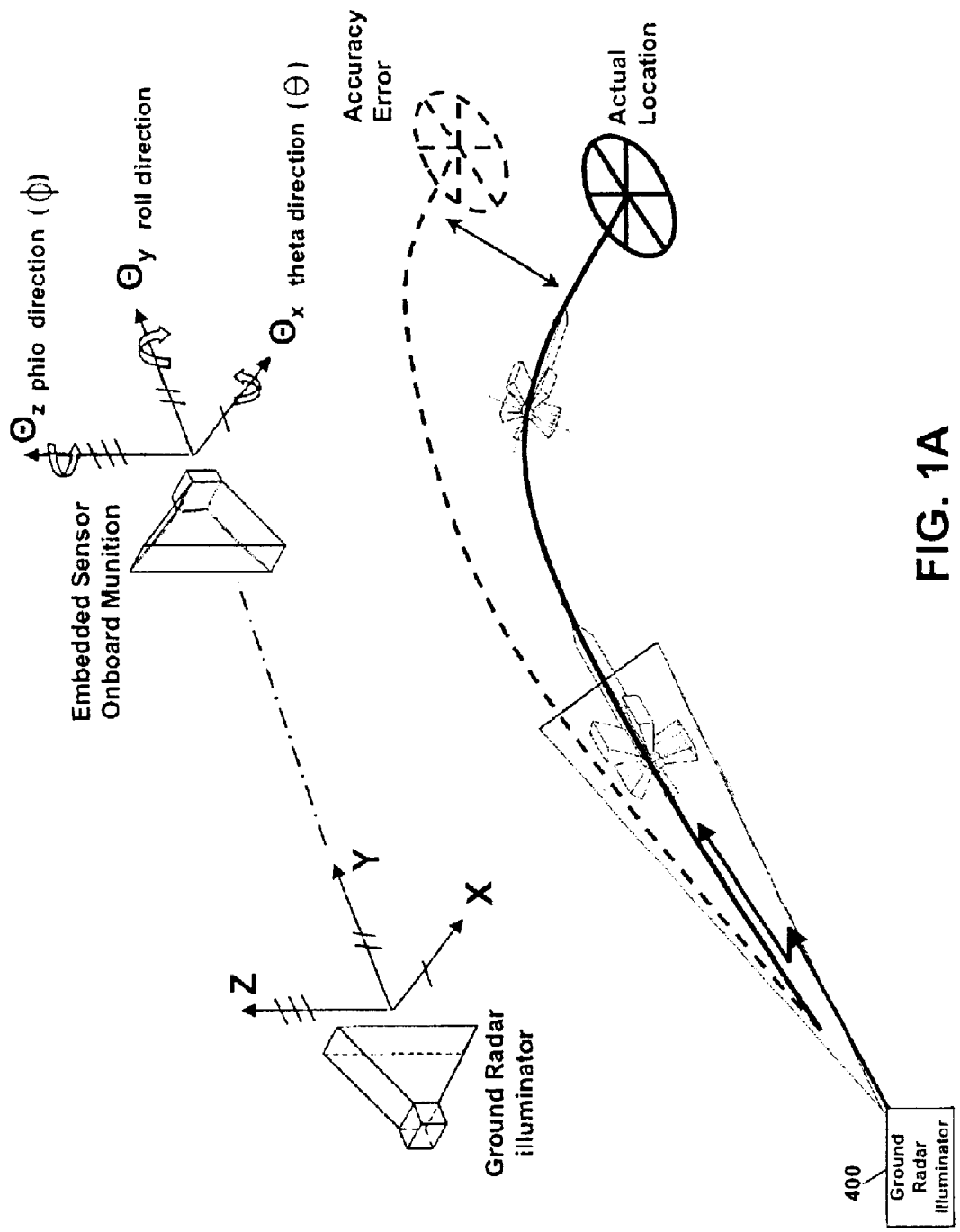
FIGS. 1A and 1B represent views of the preferred embodiment of an autonomous onboard absolute position and orientation referencing system illustrating the relative location of a plurality of waveguide sensors embedded in the fins of a munition requiring high accuracy in targeting.
Figure 1B:
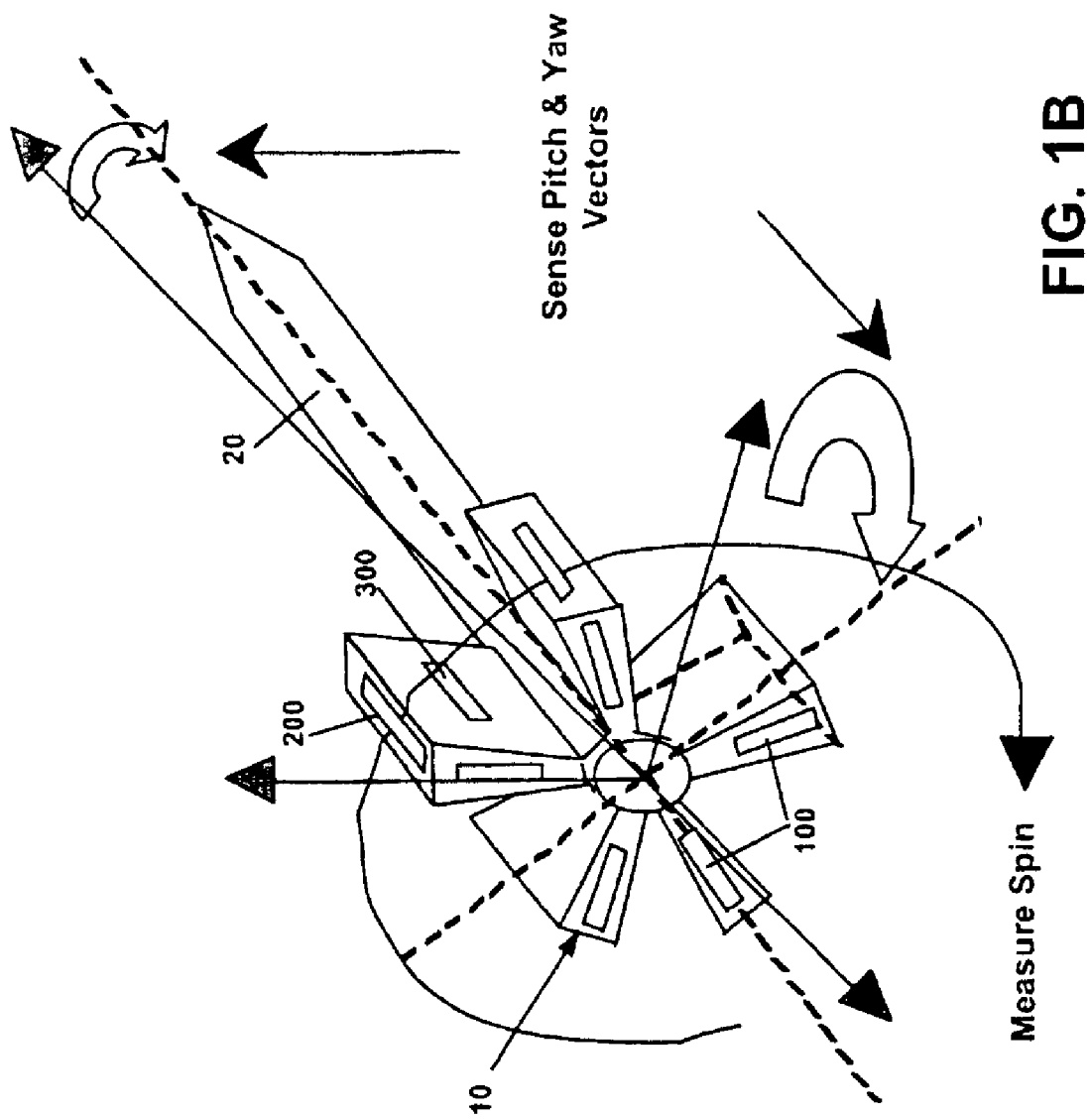

FIGS. 1A and 1B illustrate an autonomous onboard absolute position and orientation referencing system (hereinafter also referred to as "referencing system") 10 for a munition 20 requiring a high degree of accuracy. The referencing system 10 is comprised of a plurality of waveguide antennas (hereinafter also referred to as "antennas") 100, 200, 300, some of which are shown for illustration purpose.

Figure 2:
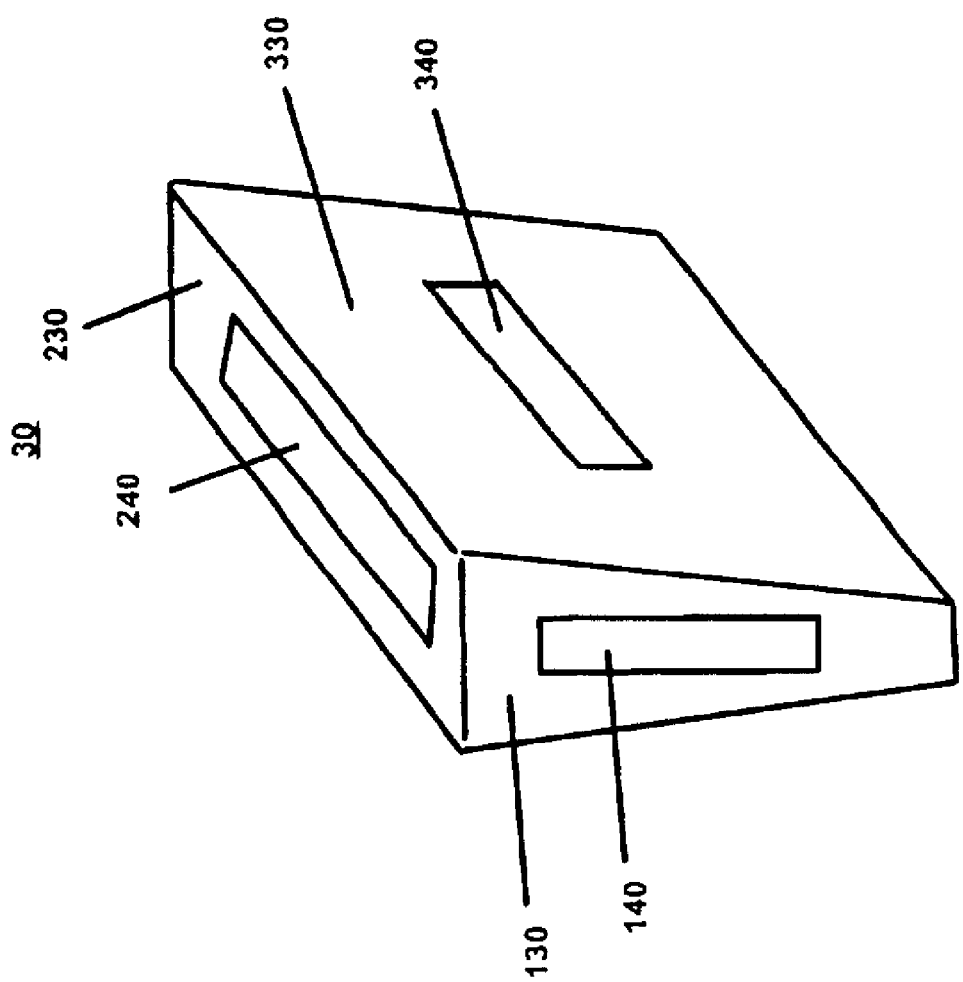
FIG. 2 is an enlarged view of a representative fin forming part of the munition of FIG. 1.

With further reference to FIG. 2, the waveguide antennas 100, 200, 300 are embedded along various sides or faces of each or selected fins 30 of the munition 20. The antennas can be categorized in three main categories: (1) a radial antenna 100 that extends along a radial face 130 of the fin 30 and is embedded within a correspondingly shaped slot 140; (2) an axial antenna 200 that extends along a radial face 230 of the fin 30 and is embedded within a correspondingly shaped slot 240; and (3) a transverse antenna 300 that extends along a side face of the fin 30, is embedded within a correspondingly shaped slot 340, and is oriented generally perpendicularly to the radial antenna 100.

The waveguide antennas 100, 200, 300 are generally similar in design and construction, and therefore only one representative antenna 100 will be described in more details. The antenna 100 is comprised of a waveguide sensor of a general class of slot waveguide antennas comprising a sensor 111 secured to the base of a waveguide 115 (FIG. 3).

Figure 3:
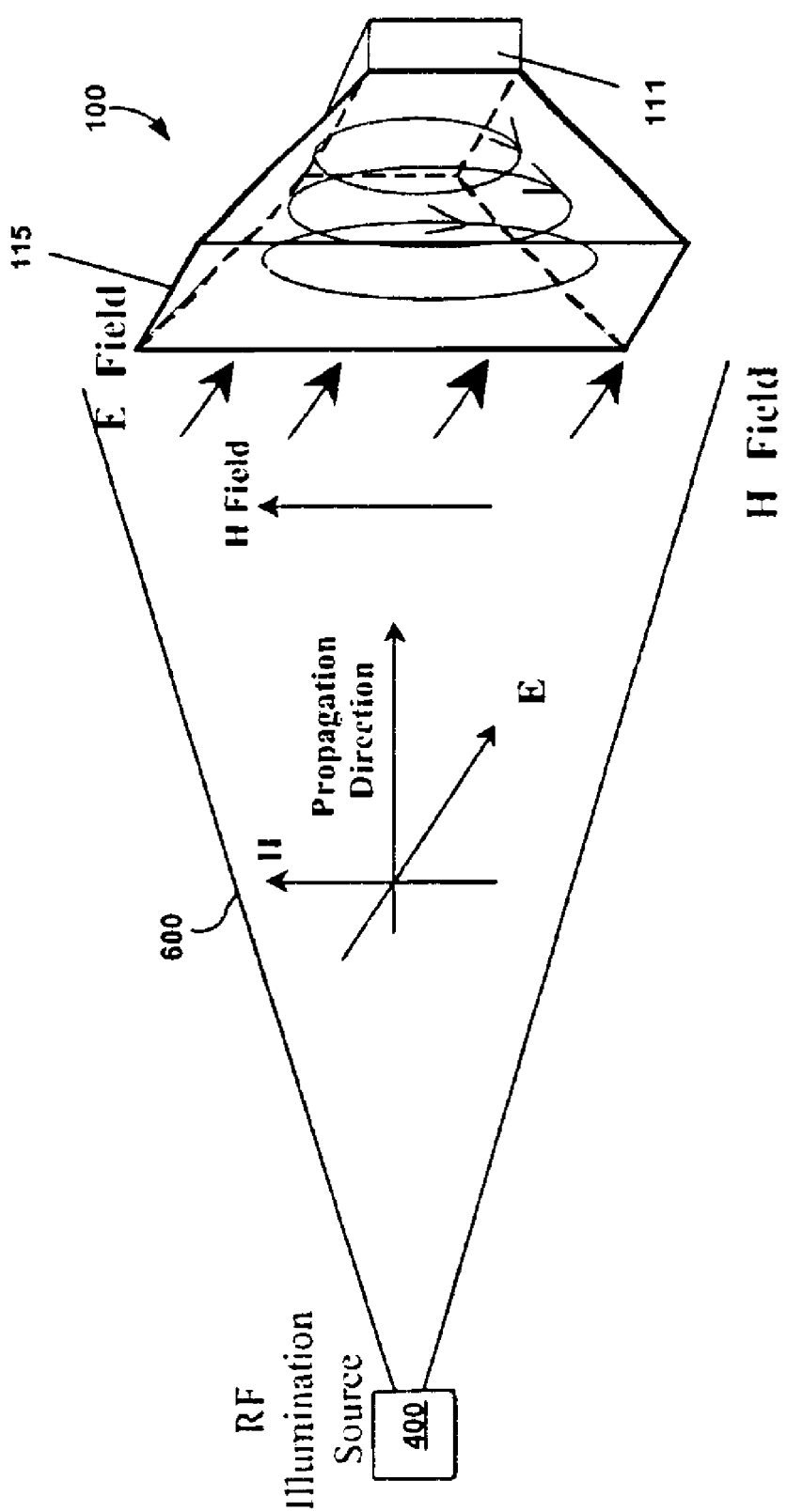
FIG. 3 is an enlarged view of a waveguide antenna of the type employed in the referencing system of FIG. 1 to be embedded in the fin of FIG. 2.

Electromagnetic signals received by the antenna 100 are processed to determine precise information provide continuous, onboard information about the angular orientation of the munition, i.e., its pitch, yaw, and roll angles, as well as its absolute position relative to a ground station 400 (FIG. 3). Further, vector information is sufficient for determining munition center-of-mass vectors and velocity rates during flight from close range to extended ranges.

Depending on the desired application, the waveguide 115 may be filled with air or a solid dielectric. The sensor 111 is inherently more robust than sensors attached to, or printed on the body of the munition. In addition to the features of the antenna 100 that have been previously enumerated, the embedded nature of the waveguide 115 enables a strong structure which is inherently capable of surviving the launch phase of the munition 20.

The relatively simple design of the antenna 100 also reduces implementation costs. Further, it is possible to establish duplex communications with the ground station 400 using the antennas 100, 200, 300.

FIG. 2 is a representation of the antennas 100 and its operation with respect to a linearly polarized radio frequency illumination source (or illuminator) emanating from a ground control station (i.e., radar) 400. The illumination source establishes a coordinate system with known and fixed orientation, and a polarization with a known plane of reference as set by the ground control station 400. The antenna 100 reacts in a predictable and prescribed manner to a polarized illumination beam 600 and can be used to establish an onboard coordinate system that is referenced to the ground station 400 by means of the polarization of the illuminator.

Thus, the polarization of the electric field established across the aperture of the onboard waveguide cavities is in the same direction the ground illuminator. The embedded waveguides sense the polarization of the electric field being emitted from the ground illuminator. The ground illuminator functions as a plane of radiation with the electric field polarized in a specific direction. The embedded waveguides detect this polarization and the onboard information becomes referenced to the ground (point of location of the illuminator). Onboard the munition, some of the embedded waveguides are in resonance (polarized electric field aligned in the direction of the shorter dimension). Those waveguides that are not in resonance with the polarization sent by the ground illuminator are "cross-polarized".

Considering the returned reflected signals, those embedded waveguides in resonance, absorb certain frequencies, the waveguides that are cross-polarized reflect more energy back to the illuminator point. Both the absorbed energy and the reflected energy possess information about the angular orientation, roll angle and distance traveled by the munition.

The information captured during the absorption cycle provides the munition with onboard information about its own orientation and position. The reflected information processed on the ground also contain munition orientation and position of the munition. Both onboard information and information processed by the radar on the ground is said to validate the orientation and position of the munition in flight.

With more specific reference to FIG. 1A, the polarization mismatch between the ground illuminator 400 and the embedded waveguide sensors is caused by a variation in the angles Theta ($\theta$) and Phi ($\phi$).

A variation in angles ($\theta$) and ($\phi$) results in a variation of power received by the waveguide sensor.

Therefore, the onboard waveguide sensors, under matched impedance and polarization have an effective cross section "Ae" that is defined by the following equation, and Prec when Zin≠Zc (mismatched polarization):

$$A_e = \frac{\lambda_o^2}{4\pi} G(\theta, \phi) \bigg| Zin = Zc$$

Thus, a munition 20 that is equipped with embedded antennas 100, 200, 300 can now determine its orientation and distance from the ground station (or illuminator) 400. This information is made available onboard the munition 20 in flight, to provide an autonomous onboard absolute position and orientation referencing system 10. As a result, the referencing system 10 enables the munition 20 to recognize its position and orientation relative to a launch platform.

FIG. 3 serves to further illustrate the operation of the embedded waveguide antennas 100, 200, 300 and the role they play in implementing the referencing system 10 for the munition 20. A plane-polarized radio frequency wave acting as the illumination beam 600 and emanating from the ground station 400 propagates through free space and reaches one or more of the munition-mounted waveguides 115 onboard the munition 20. By definition, the electric field E and the magnetic field H of the illumination beam 600 are orthogonal relative to each other, and both fields E and F are mutually orthogonal to the direction of propagation of the illumination beam 600.

The illumination beam 600 is capable of communicating the absolute reference coordinates of the ground station 400 to the munition 20. If the absolute coordinate system of the ground station 400 is given the coordinates X, Y and Z, then the coordinate system for the munition 20 can be designated X", Y" and Z". The two coordinate systems are related to each other by linear transformation. (Could you please add a new figure showing these two coordinate systems and how they are related to each other).

Furthermore, the relative orientation of each waveguide 115 with respect to the incoming illumination beam 600 is determined by its "reaction" with the beam 600. Specifically, the pitch, yaw and roll of the munition change the angle of the waveguide 115 with respect to the illumination beam 600 and, in turn, lead to predictable changes in the coupling between the illumination beam 600 and the waveguide 115 of the munition 20. The signal information from the various waveguides 115 can then be processed and the orientation of the munition deconvolved from the waveguide data.

It should be apparent that other modifications may be made to the present referencing system 10 without departing from the spirit and scope of the invention. As an example, though the present invention has been described in relation to a projectile, it should be clear to one of ordinary skill in the field that the present invention may also be used with objects in flight or stationary.

What is claimed is:

1. A Onboard autonomous referencing system for measuring an angular orientation of an object having an external structure, relative to an illuminating source that emits a polarized radio frequency field, the system comprising:

a cavity type waveguide that is embedded in the external structure of the object and that receives the polarized radio frequency field along a predetermined plane;

wherein the polarized radio frequency field comprises an electric field component and a magnetic field component;

wherein the electric field component defines an electric field orientation angle with the predetermined plane;

wherein the magnetic field component defines a magnetic field orientation with the predetermined plane; and a sensor that converts the electric field orientation and the magnetic field orientation at a resonance point of the waveguide, to the angular orientation of the object relative to the illuminating source.

2. The system of claim 1, wherein the sensor further converts the electric field orientation and the magnetic field orientation at the resonance point of the waveguide into a position of the object relative to the illuminating source.

3. The system of claim 1, wherein the waveguide is generally horn shaped.

4. The system of claim 1, wherein the waveguide has a generally pyramidical shape.

5. The system of claim 1, wherein the waveguide has a generally sectoral shape.

6. The system of claim 1, wherein the waveguide has a feed point, and wherein the resonance point is located at the feed point.

7. The system of claim 6, wherein the sensor is located at the feed point.

8. The system of claim 1, wherein the waveguide faces the illuminating source.

9. The system of claim 1, wherein the waveguide partially faces the illuminating source.

10. The system of claim 1, wherein the waveguide does not face the illuminating source.

11. The system of claim 1, wherein the waveguide is secured to the object.

12. The system of claim 1, wherein the waveguide is embedded in the object.

13. The system of claim 1, wherein the object is moving object relative to the illuminating source.

14. The system of claim 1, wherein the object is a static relative to the illuminating source.

15. The system of claim 1, wherein the object is a projectile.

16. The system of claim 1, wherein the object is a projectile in flight.

17. The system of claim 1, wherein the object is an object in flight.

18. The system of claim 1, wherein the object is stationary.

19. The system of claim 1, wherein the orientation of the object comprises a pitch orientation, a yaw orientation, and a roll orientation.

20. A projectile comprising an onboard autonomous reference system that measures an angular orientation of the projectile relative to an illuminating source that emits a polarized radio frequency field from a platform, the projectile comprising:
- a cavity type waveguide that is embedded in an external structure of the object and that receives the polarized radio frequency field along a predetermined plane;
- wherein the polarized radio frequency field comprises an electric field component and a magnetic field component;
- wherein the electric field component defines an electric field orientation angle with the predetermined plane;
- wherein the magnetic field component defines a magnetic field orientation with the predetermined plane; and
- a sensor that converts the electric field orientation and the magnetic field orientation at a resonance point of the waveguide, to the an angular orientation of the object relative to the illuminating source.

21. The system of claim 20, wherein the waveguide is generally horn shaped.

22. The system of claim 20, wherein the waveguide has a generally pyramidical shape.

23. The system of claim 20, wherein the waveguide has a generally sectoral shape.

24. The system of claim 20, wherein the waveguide has a feed point, and wherein the resonance point is located at the feed point.

25. The system of claim 24, wherein the sensor is located at the feed point.

26. The system of claim 20, wherein the waveguide faces the illuminating source.

27. The system of claim 20, wherein the waveguide partially faces the illuminating source.

28. The system of claim 20, wherein the waveguide does not face the illuminating source.

29. The system of claim 20, wherein the waveguide is secured to the object.

30. The system of claim 20, wherein the waveguide is embedded in the object.

31. The system of claim 20, wherein the object is moving object relative to the illuminating source.

32. The system of claim 20, wherein the object is a static relative to the illuminating source.

33. The system of claim 20, wherein the object is a projectile.

34. The system of claim 20, wherein the object is a projectile in flight.

35. The system of claim 20, wherein the object is an object in flight.

36. The system of claim 20, wherein the object is stationary.

37. The system of claim 20, wherein the orientation of the object comprises a pitch orientation, a yaw orientation, and a roll orientation.

38. The system of claim 20, wherein the external structure comprises at least one fin.

39. The system of claim 20, wherein the sensor further converts the electric field orientation and the magnetic field orientation at the resonance point of the waveguide into a position of the object relative to the illuminating source.

40. A method for autonomously measuring an angular orientation of an object having an external structure, relative to an illuminating source that emits a polarized radio frequency field, the method comprising:
- receiving the polarized radio frequency field along a predetermined plane by means of a cavity type waveguide that is embedded in the external structure of the object;
- wherein the polarized radio frequency field comprises an electric field component and a magnetic field component;
- wherein the electric field component defines an electric field orientation angle with the predetermined plane;
- wherein the magnetic field component defines a magnetic field orientation with the predetermined plane; and
- converting the electric field orientation and the magnetic field orientation at a resonance point of the waveguide by means for a sensor, to the angular orientation of the object relative to the illuminating source.

41. The method of claim 40, further comprising converting the electric field orientation and the magnetic field orientation at the resonance point of the waveguide into a position of the object relative to the illuminating source.

42. An Onboard autonomous referencing system for measuring an angular orientation of an object relative to an illuminating source that emits a polarized radio frequency field, the system comprising:
- a cavity type waveguide that is embedded in the object and that receives the polarized radio frequency field along a predetermined plane;
- wherein the polarized radio frequency field comprises an electric field component and a magnetic field component;
- wherein the electric field component defines an electric field orientation angle with the predetermined plane;
- wherein the magnetic field component defines a magnetic field orientation with the predetermined plane; and
- a sensor that converts the electric field orientation and the magnetic field orientation at a resonance point of the waveguide, to the angular orientation of the object relative to the illuminating source.

* * * * *